Dec. 31, 1968  H. Z. HIGHT ET AL  3,419,647
PLASTIC SEALING OFF OF PIPE
Filed Jan. 24, 1966  Sheet 1 of 3

INVENTORS
HANFORD Z. HIGHT,
MELVIN M. GALLANT,
BY GEORGE W. SHANNON &
JACOB F. LOEFFLER

Richard S. Shreve
ATTORNEY

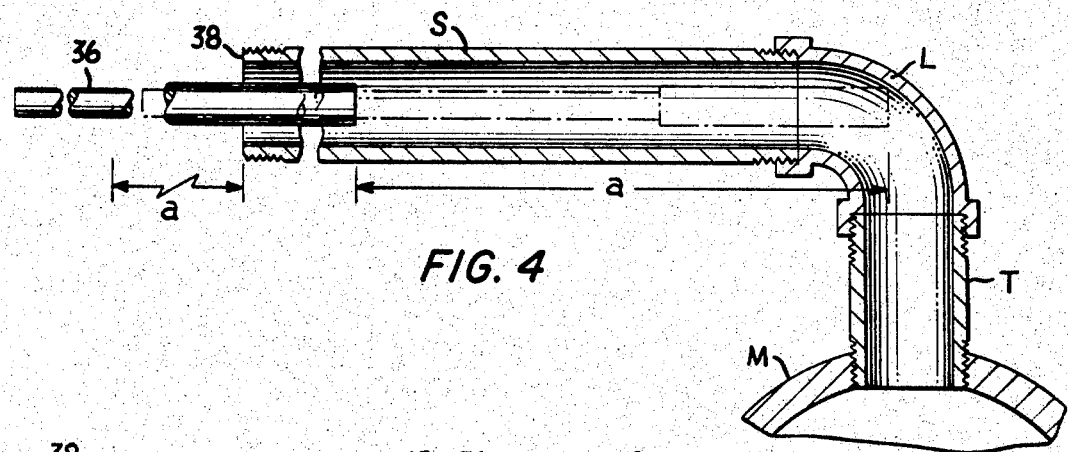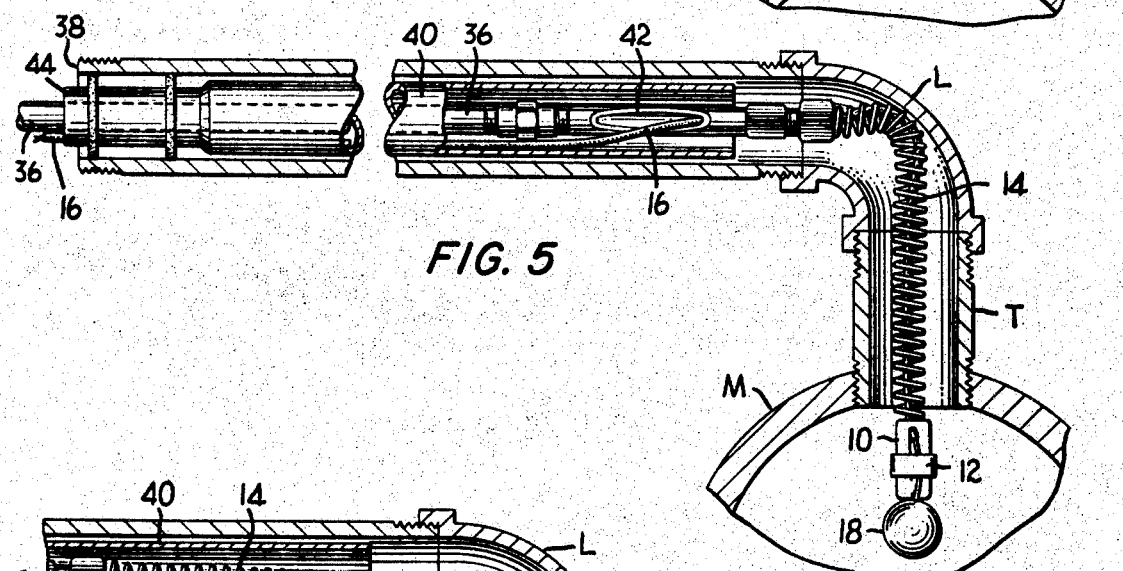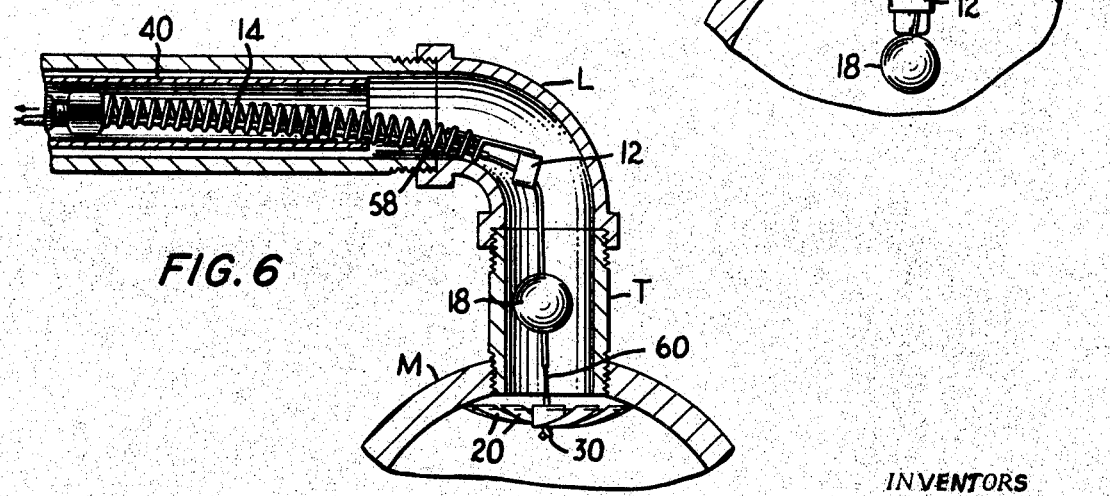

Dec. 31, 1968    H. Z. HIGHT ET AL    3,419,647
PLASTIC SEALING OFF OF PIPE
Filed Jan. 24, 1966    Sheet 3 of 3
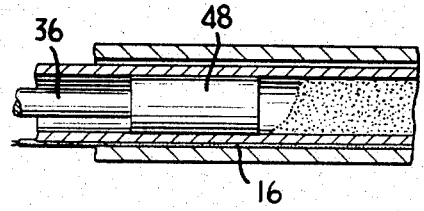
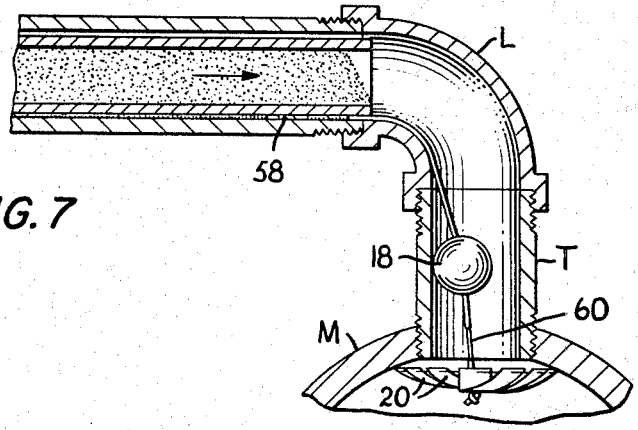
FIG. 7
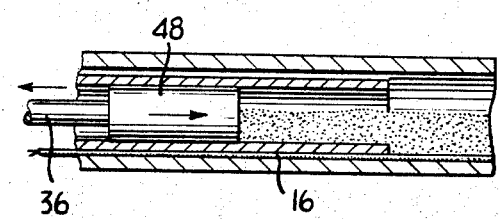
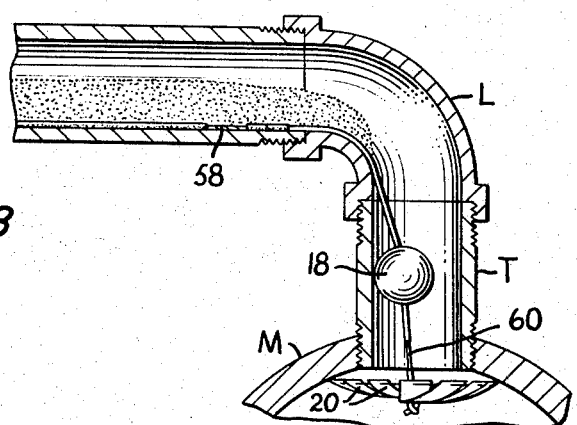
FIG. 8
FIG. 9
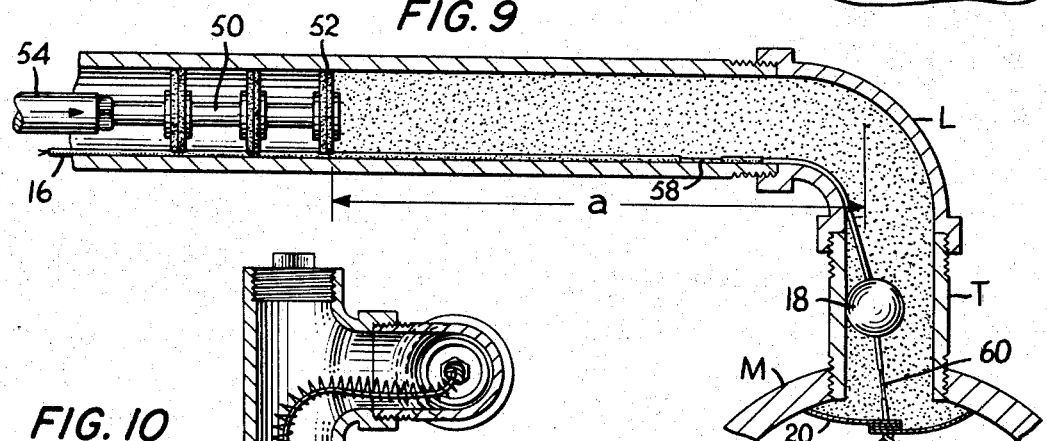
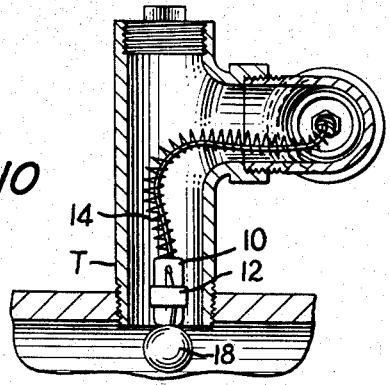
FIG. 10
INVENTORS
HANFORD Z. HIGHT,
MELVIN M. GALLANT,
GEORGE W. SHANNON &
JACOB F. LOEFFLER
Richard S. Shreve Jr.
ATTORNEY

United States Patent Office 3,419,647
Patented Dec. 31, 1968

3,419,647
PLASTIC SEALING OFF OF PIPE
Hanford Z. Hight, Short Hills, Melvin M. Gallant, Orange, George W. Shannon, West Orange, and Jacob F. Loeffler, Point Pleasant, N.J., assignors to Bonded Products, Inc., Orange, N.J., a corporation of Illinois
Filed Jan. 24, 1966, Ser. No. 522,658
8 Claims. (Cl. 264—35)

ABSTRACT OF THE DISCLOSURE

A backer of jointed leaves having a common pivot is pushed through a gas pipe beyond the end thereof into a gas main, and spread out over the inner end of the pipe to hold sealing material propelled along the pipe to seal off the gas main.

---

This invention relates to plastic sealing off of pipe, and more particularly to method and apparatus for plugging discontinued gas service lines at the gas main.

When gas service is discontinued for any reason such as conversion of the home to all electric supply, change of the building to other purposes, or houses being torn down as in urban renewal, the gas company disconnects the meter and frequently caps the service in the basement. This is undesirable for several reasons.

There is still gas from the main through the service up to the point of capping. This inactive service can corrode and develop leaks without the knowledge of the gas company which no longer has access to the house. This service is not now revenue producing, and should be eliminated from the base rate structure of the company, and also as taxable property, and further as a source of liability for the company. Pressure is put on the utilities by commissions and insurance carriers to properly abandon or retire such services to eliminate these undesirable features.

Heretofore the only way for a gas company to fully abandon the service was to dig up a hole in the street over the service connection at the main, cut the service, and insert a plug in the main at the tap formerly used by the service fittings. The great expense and adverse public relations of a street opening is also in this case non-productive of future revenue.

It is therefore the main object of the present invention to avoid the difficulties referred to above, and to provide method and apparatus for sealing off the gas service at the gas main by working through the exposed end of the service line without digging up the street.

For material to seal off the gas service, we propose to use a material generally similar to the epoxy resin formulation employed in the Hight et al. Patent No. 3,211,573 and Shannon Patent No. 3,211,574, but preferably formulated with a substantial increase in thixotropy, and made electrically conductive. However, the service line is generally connected to a tap in the top of the gas main, which gives rise to the problem of keeping the sealing material from falling into the gas main to obstruct the same.

It is therefore another object of the present invention to provide a backer which can be collapsed and inserted through the exposed end of the service line on into the gas main, and there expanded in response to manipulation from outside of the exposed end to a diameter greater than that of said gas service line.

According to the present invention, the collapsed backer comprises an umbrella-like or fan-like element which is pushed along the service line on through the angle fitting to the inside of the gas main. There the backer is expanded or fanned out to a diameter greater than that of the angle cavity, and the expanded backer is contacted with the inside of the gas main outside of the rim of the angle cavity. Then a charge of sealing material is pushed along the service line down through the angle fitting against the expanded backer. This charge completely plugs the fitting at the main, and generally is pushed out around under the bottom of the tap in the main.

Preferably the collapsed backer has a flexible pusher inserted in tandem therewith, for example in the form of a coil spring, to pass said backer around inside the angle fitting on beyond the inner end thereof. The backer also has a tether which is retracted to pull the expanded backer toward the rim of the angle cavity. The flexible pusher is preferably withdrawn before the sealing material is charged, and the propelled charge fills the entire space between the tether and the wall of the angle cavity for at least the far portion of the common length thereof.

Preferably the backer and tether are left in position after the sealing material has hardened to form therewith an expendable part of the seal.

The collapsible and expansible backer preferably comprises a plurality of superimposed leaves having a common pivot, preferably near one end of said superimposed leaves, and a spring is preferably coiled about the common pivot with the respective ends thereof connected to the respective upper and lower leaves to fan said leaves out about the common pivot.

The flexible pusher preferably carries a socket in which the collapsed backer is fitted, and a fender weight is carried by the tether ahead of the backer to fall therewith through the rim of the angle tap, after which the flexible pusher is jiggled to cause the weight of the fender to pull the collapsed backer out of the pusher socket, and permit the spring to fan out the leaves of the backer.

In the drawings:

FIG. 4 is a vertical section through a service line, angle fitting, tap, and gas main to be sealed off;

FIG. 5 is a similar section showing the collapsed backer pushed by the flexible pusher through the line and fitting into the main;

FIG. 6 is a similar section showing the backer pulled out of the socket on the flexible pusher by the weight of the fender mounted on the tether, and expanded by the fanning spring;

FIG. 7 is a similar section showing the introduction of the charge of sealing material into the far end of the service line;

FIG. 8 is a similar section showing the removal of the charge carrier cylinder;

FIG. 9 is a similar section showing the propelling of the charge through the angle fitting against the rear of the expanded backer; and FIG. 10 is a similar section showing the flexible pusher passing around inside the angle fitting before the backer is opened.

Figure 1:
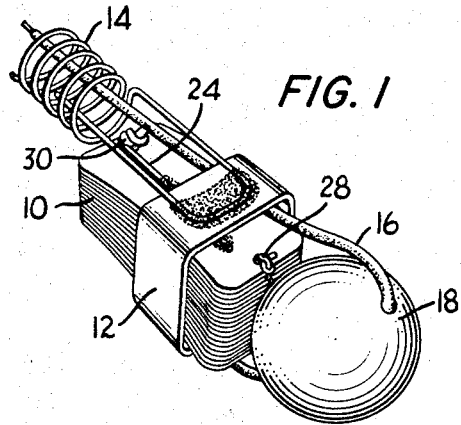
FIG. 1 is a perspective view of the top of the collapsed backer employed in, and according to, the preferred embodiment of the present invention.
Figure 2:
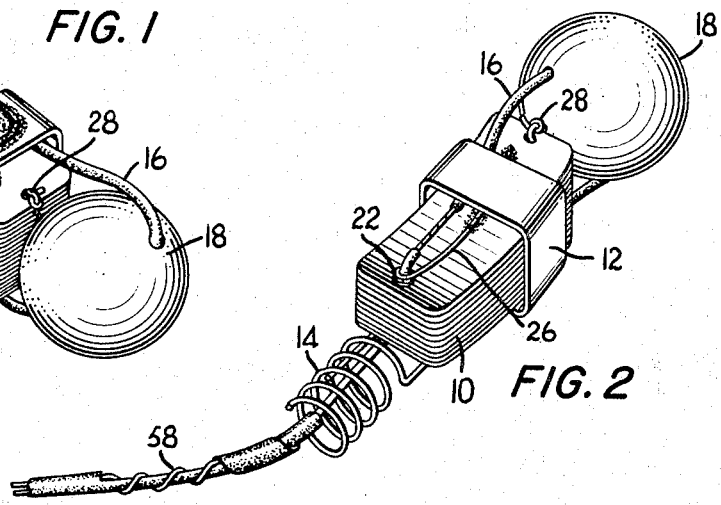
FIG. 2 is a similar view of the same in inverted position.

As shown in FIGS. 1 and 2, the collapsed backer 10 is mounted in a releasable retainer such as a clip or socket 12 carried by a flexible pusher in the form of a coil compression spring 14. The backer 10 is provided with a tether 16 which passes through a fender formed by a ball 18 and held in position ahead of the backer 10 by the tether 16.

Figure 3:
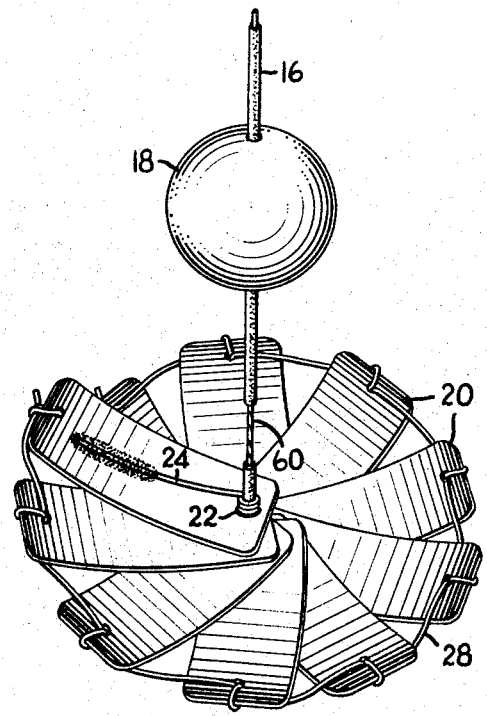
FIG. 3 is a similar view with the leaves thereof fanned out by the released spring into expanded position.

As shown in FIG. 3, the expanded backer comprises a plurality of superimposed leaves 20 joined together in a fan-like or umbrella like arrangement. These leaves have a common pivot, preferably near the inner end thereof, and formed by the coil of a spring 22 having a top extension 24 secured to the top leaf and a bottom extension secured to the bottom leaf. When the leaves are folded up as shown in FIGS. 1 and 2, the spring 22 is in torsion, urging the leaves to open up as in FIG. 3. An angle spacer is formed by a flexible element such as a piece of string 28 secured to the successive outer ends of the respective leaves at substantially equal intervals. The lower end of the tether 16 passes through hte coil of the spring 22 and terminates in a knot 30 shown in FIG. 1.

The first step in the operation is to obtain access to the service pipe itself, similar to the procedure described in the Hight et al. and Shannon patents. This is accomplished by the removal of the fittings in the basement so that a full opening ball valve can be put on the service to give control at all times against possible leakage of gas to the operator. All later steps are conducted through diaphragms, stuffing boxes or with stoppers to prevent gas flowing out of the valve, when, of necessity, it is open for the introduction of tools.

As shown in FIG. 4, the service line S is connected by an angle fitting or elbow L to a tap T for the gas main M. A street T and and a street L are frequently employed. The service line, fitting, and main are generally buried in the earth, except the exposed end of the service pipe which is away from the main. To start the operation, a flexible rod 36, which may be several lengths assembled on the job, is pushed down the length of the service to the position shown in dotted lines, and a base mark is established on the rod extending back out of the exposed end 38 of the service line S. This distance is checked with surface measurements of the service to make sure that the rods run the full length of the service and have not hit some obstruction between the end 38 and the elbow L.

The rod 36 is connected to the flexible pusher 14 shown in FIGS. 1 and 2, which provides the flexibility necessary to wiggle through the combination of fittings at the main. The tether 16 which passes back inside the flexible pusher 14 on into the rod 36, then passes out through an aperture 42 in the side of the rod as shown in FIG. 5, and then is free inside the service for the rest of the distance. This entire assembly is pulled back into the cartridge 40 shown in FIG. 4.

Two rods are used to push the assembly down the service pipe. One rod 44 is attached to the cartridge 40. The other rod 36 which is attached to the flexible pusher 14 runs through the trailing end of the cartridge 40. The whole assembly mounted on the two rods is pushed down to the fittings L and T at the main M. Then the whole assembly, utilizing both rods, is pulled back about three inches.

Then the rod 44 attached to the cartridge 40 is held firmly in stationary position, while the rod 36 attached to the pusher spring 14 and socket 12 is pushed forward out of the cartridge to take the collapsed backer 10 into the fitting at the main. A jiggling motion is necessary to make this advance so that the assembly can wriggle through the turns in the fittings. The ball 18 gives a round leading edge to the assembly, to decrease the likelihood of it hanging up on the way down.

When the rod 36 has advanced a measured distance determined by the bench mark on the rod, the operator knows that the backer assembly is hanging free as shown in FIG. 5. Then the rod 36 attached to the spring 14 is moved back and forth repeatedly to shake the backer 10 out of the clip 12, using the weight of the ball 18 to pull the backer down for this purpose.

Once the collapsed backer 10 is free of the clip 12, the spring 22 fans out the leaves 20 to expand the backer, the string 28 spacing the leaves at substantially equal angles. With the backer now open, the whole assembly is pulled back to the position shown in FIG. 5. The ball 18 serves to space the tether 16 from the wall of the tap T, to center the open backer with the bottom of the tap. The open backer has a diameter larger than that of the angle fitting so as to engage the inside of the gas main at the top surrounding the threads where the fitting is screwed into the main. The open backer is also dished so as to be concave toward the fitting.

With the open backer centered and retracted, both rods 36 and 44 are pulled out of the service pipe. The rod 36 pulls the spring pusher 14, socket 12 and aperture 42 back over the tether 16. The rod 44 pulls the empty cartridge 40 back out of the service pipe. This leaves only the tether 16 and ball 18 in service holding the open backer in position to receive the sealing material.

The sealing material such as epoxy resin formulation is preferably a two component material which is mixed immediately prior to loading. The working life is more than sufficient to permit time for the full operation. The mixture will cure in a matter of hours after being forced into the fitting. There is no need for an immediate cure because the mass of the material itself before cure serves to prevent leakage. During the cure there is no shrinkage sufficient to affect the sealing. The properties of the material are such that there is no possible deterioration over the years.

This material is loaded into a cartridge 46 shown in FIGS. 7 and 8, against a piston 48 inside the cartridge. The loaded cartridge again is put down the length of the service line using two rods, one rod 44 attached to the cartridge and the other rod 36 attached to the piston 48.

When the entire cartridge assembly has been pushed down to the fitting at the main, as far as it will go, the rod 36 attached to the piston 48 is held firmly in stationary position and the rod 44 is used to pull the cartridge 46 back over the piston as shown in FIG. 8. This deposits a layer of substantially even thickness along the bottom of the service pipe. The amount of material is predetermined to be sufficient to properly fill the fitting at the main and several inches of the service pipe itself. Then both rods are pulled back to withdraw the cartridge assembly, leaving the material spread along the pipe for a distance of three or four feet.

To push the deposited material down into the fitting, a stopper-plunger device is employed as shown in FIG. 9. The plunger comprises a stem 50 on which are mounted spaced resilient wipers 52 compressed within the service line and pushed therealong by the rod 54. The material propelled against the expanded backer which has the dished shape concave toward the fitting, is thereby forced back against the top of the inside of the gas main to seal the threads where the fitting is screwed into the main.

FIG. 9 also shows the control system to prevent the material from being pushed beyond the opened backer. This system requires the sealing material to be electrically conductive. For this purpose, the correct amount of graphite or carbon black, or other inexpensive conductor material, is included in the epoxy resin formulation. The tether 16 for the backer 10 is a two conductor insulated wire. One conductor 56 thereof is terminated and stripped bare of insulation for about three eighths of an inch as at 58, about an inch or two back from the ball 18, just about at the end of the service line entering the fitting. The other element of the two conductor wire continues on through the ball 18 and is attached to the backer 10. The insulation on the wire insulates it from the ball and the spring 22 and the rest of the backer, but is stripped off to bare about a quarter of an inch of wire at 60, about an eighth of an inch above the backer.

At the exposed end of the service line, the two wires are attached to the leads of a volt/ohm meter. The stopper-plunger device 50 is pushed by the rod 54 to accumulate the material to fill the service line and then advance the material into the fitting. As the material advances, it passes over the wire 16 which is lying on the bottom and over the end of the pipe. The material advances into the fitting and down into the tap. When the material reaches the exposed wire at 60 near the backer, conductivity is established through the material to the point 58, and the needle of the meter instantaneously jumps to show that current is now passing through the two wires which are now connected by means of the conductive material.

The use of the two conductor wire and the conductive sealing material is most important in properly positioning the material in the fitting. The operator has no means of being certain what type of fittings may have been used at the main, so that there is a considerable variation in the amount of material necessary to plug the same. The advanced exposed wire is the point which must be reached, regardless of the type of fitting.

The stopper-plunger 50 has a left hand thread connection to the rod 54, so that in the final position thereof the rod can be unscrewed easily leaving the stopper in position at the end of the material in the service line. This is an expendable item for two reasons. If the stopper were pulled back and out it would suck the material back out of the fitting, because of the vacuum existing there. Also, the plunger 50 which forces the material forward now serves as an effective stopper against leakage, and certainly will function as such until the material has set up properly in final form.

In summary, the important feature is that the service has been properly abandoned and that the fittings are filled with a permanent plugging material which extends below the fitting itself against the expanded backer and consequently against the main and around the tap. All this has been accomplished without a street opening. In addition the important advantage is obtained in that traffic is not disturbed and public relations are maintained at a high level.

We claim:

1. Method of sealing off the inner end of a substantially horizontal gas service line which is coupled to an angle fitting that is screwed into the top of the gas main, wherein the gas main, gas line, and angle fitting are all embedded in the earth except for an outer end of the said line; which method comprises inserting a collapsed backer through said exposed end, propelling said collapsed backer along inside said cavity to pass beyond the inner end thereof, expanding said backer by fanning out to a diameter greater than that of said angle fitting in response to manipulation from outside said exposed end, retracting said expanded backer to engage the inside of said gas main outside of the rim of said angle fitting, passing a charge of sealing material into said exposed end, propelling said charge along inside said cavity to impinge against the rear of said backer to fill at least the far end of said cavity, and forcing the sealing material back against the top of the inside of the gas main to seal the threads where the fitting is screwed into the main.

2. Method of sealing off the inner end of a cavity as claimed in claim 1, in which said collapsed backer has a releasable retainer on said flexible pusher, said backer is spring pressed to expand, a fender weight is mounted on said tether, inserting said weight ahead of said backer so as to fall therewith through the far end of said angle fitting, after which jiggling said flexible pusher to cause the weight of said fender to release said backer from said retainer to fan out beyond the rim of said angle fitting.

3. Apparatus for sealing off the inner end of an elongtaed tubular cavity having the outer end exposed, in which said cavity is a substantially horizontal gas service line coupled to an angle fitting leading from a gas main, which apparatus comprises a collapsed backer of joined leaves inserted through said exposed end, means for propelling said collapsed backer along inside said cavity to pass on beyond the far end thereof, said propelling means comprising a flexible pusher whereby a jiggling motion thereof can wriggle said collapsed backer through the turn of the fitting, means for fanning out said backer to a diameter greater than that of said cavity in response to manipulation from outside said exposed end, means for retracting said expanded backer toward the rim of said cavity, means for passing a charge of sealing material into said exposed end, and means for propelling said charge along inside said cavity to impinge against the rear of said backer to fill at least the far end of said cavity.

4. Apparatus for sealing off the inner end of a cavity as claimed in claim 3, in which said backer has a tether comprising a pair of insulated wires having bared portions in spaced relation, and said sealing material is electrically conductive so as to energize a signal circuit when the quantity of said propelled material is sufficient for the seal.

5. Apparatus for sealing off the inner end of a cavity as claimed in claim 3, in which said backer comprises a plurality of superimposed leaves having a common pivot.

6. Apparatus for sealing off the inner end of a cavity as claimed in claim 3, in combination with said flexible pusher having a socket in which said collapsed backer is fitted.

7. Apparatus for sealing off the inner end of a cavity as claimed in claim 3, in combination with a tether connected to said backer, and a fender carried by said tether ahead of said backer.

8. Apparatus for sealing off the inner end of a cavity as claimed in claim 3, in combination with spring means for urging said leaves to fan out about said common pivot, and spacer means for determining the angular spaced relation of said fanned out leaves.

References Cited

UNITED STATES PATENTS

| | | | |
|---|---|---|---|
| 1,839,861 | 1/1932 | Baker | 166—132 |
| 2,330,659 | 9/1943 | Anderson | 166—132 |
| 2,646,845 | 7/1953 | Schillinger | 166—192 X |
| 3,211,573 | 10/1965 | Hight et al. | 118—408 X |

ROBERT F. WHITE, *Primary Examiner.*

K. J. HOVET, *Assistant Examiner.*

U.S. Cl. X.R.

166—132, 195, 202; 264—36; 18—1